April 15, 1930.     R. S. STEWART     1,754,374
ANNEALING POT
Filed Oct. 12, 1927
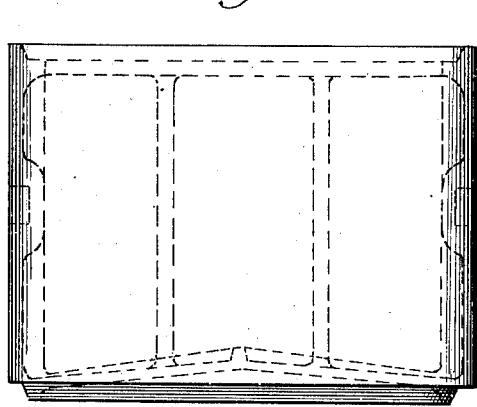
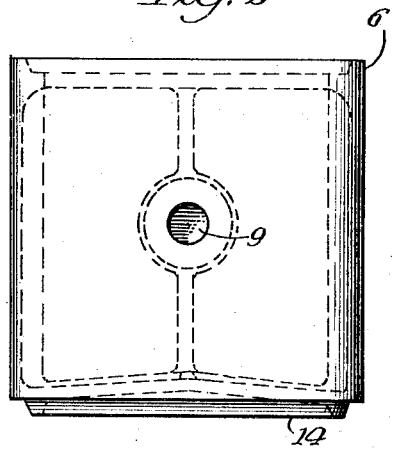
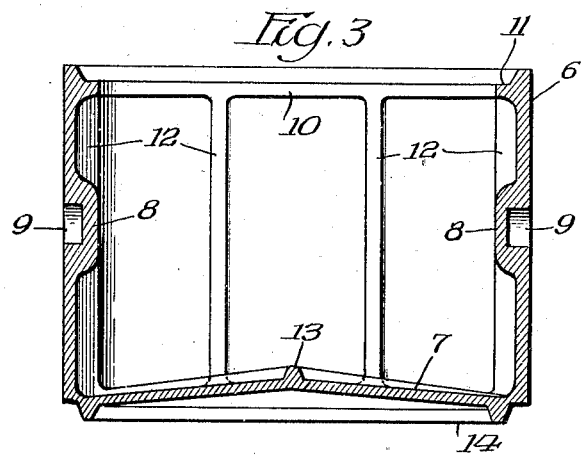
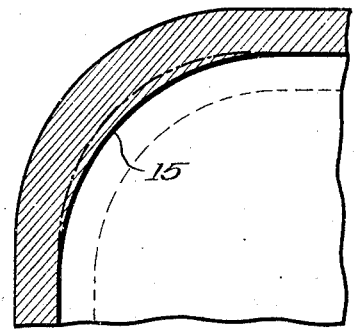
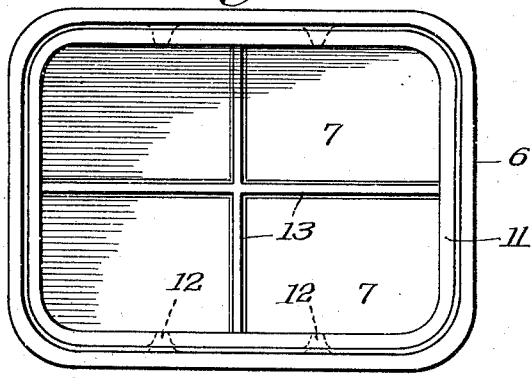
Inventor
Robert S. Stewart
By Wm O. Belt
Atty.

Patented Apr. 15, 1930

1,754,374

UNITED STATES PATENT OFFICE

ROBERT S. STEWART, OF CHICAGO, ILLINOIS, ASSIGNOR TO THE AMERICAN BRAKE SHOE & FOUNDRY COMPANY, OF NEW YORK, N. Y., A CORPORATION OF DELAWARE

ANNEALING POT

Application filed October 12, 1927. Serial No. 225,657.

This invention relates to annealing pots and it has for its object to avoid, as far as possible, the provision of projections on the outer surface of the pot and thereby reduce to a minimum the wear from oxidation and scaling.

Heretofore projecting trunnions have been provided on the walls of annealing pots to facilitate handling, but these projecting trunnions are subjected to severe action of the flames in the oven and oxidize and wear rapidly. Furthermore they form projections which are to some extent disadvantageous in the use of the pots.

My invention has for its object primarily to avoid the use of projecting trunnions and to provide trunnion recesses which can be luted after the pots have been stacked in the oven so that the walls of the pot will present an unbroken exterior face.

In the accompanying drawings I have illustrated the invention in a closed bottom pot of rectangular shape with rounded corners, but I do not restrict the invention to a pot of this construction and reserve the right to embody it in open bottom pots and in round pots and pots of other shapes.

Referring to the drawings:

Fig. 1 is a side elevation and Fig. 2 is an end elevation of the pot.

Fig. 3 is a longitudinal sectional view of the pot.

Fig. 4 is a top plan view of the pot.

Fig. 5 is a detail sectional view.

The pot shown in the drawings is a one-piece casting having walls 6 and a bottom 7. Opposite walls are provided with integral projections 8 extending inwardly of the pot and these projections are provided on the outer face of the walls with recesses 9 for receiving supporting trunnions for the pot suitably located in opposite walls thereof.

The walls are provided interiorly with a peripheral rib 10 adjacent the upper edge thereof to provide a shoulder 11 to receive the bottom of another pot when they are stacked in an oven. A plurality of spaced ribs 12 extend from the peripheral ribs 10 to the bottom of the pot on the inside of the walls of the pot and crossed ribs 13 are provided on the inside of the bottom of the pot, to reinforce and strengthen the walls and bottom. A marginal rib 14 is provided on the bottom of the pot on the outside thereof, and is spaced from the outer face of the walls of the pot to fit within the top of another pot and rest upon the shoulder 11.

I may make the pot in rectangular, round or in any other shape, with a closed bottom or with an open bottom, and the bottom may be corrugated, as set forth in my companion application Serial No. 225,654 filed concurrently herewith; and when the pot is made with curved corners, or with corrugations I provide an excess of metal 15 on the inside thereof to form a "compensated" radius, as more fully set forth in my application Serial No. 222,994, filed September 30, 1927. Other changes in the form, construction and arrangement of pots embodying the invention may be made within the scope of the following claims:

I claim:

1. An annealing pot having walls, oppositely disposed integral projections on the inside of said walls, said projections being recessed on the outside of the walls for receiving trunnion supports for the pot, and ribs on the inside of said walls merging with and integral with said projections.

2. An integral annealing pot comprising walls and a bottom, an annular rib on the inside of the walls adjacent the top of the pot, a plurality of spaced vertical ribs on the inside of the walls extending from the annular rib to the bottom of the pot and crossed ribs on the inside of the bottom of the pot.

ROBERT S. STEWART.